(12) United States Patent
Finder et al.

(10) Patent No.: US 8,097,675 B2
(45) Date of Patent: Jan. 17, 2012

(54) 2,2'-MDI-BASED ISOCYANATE MIXTURES, POLYISOCYANATE POLYADDITION PRODUCTS PREPARED THEREFROM, PROCESSES FOR MAKING THE SAME AND METHODS FOR THEIR USE

(75) Inventors: Zdenka Finder, Rohrenfels (DE); Jens Krause, Mours Saint Eusebe (FR); Friedhelm Faehling, Duisburg (DE); Manfred Schmidt, Dormagen (DE); Dirk Wegener, Monheim (DE)

(73) Assignees: Bayer MaterialScience AG, Leverkusen (DE); Polytex Sportbelage Produktions GmbH, Grefrath (DE)

( * ) Notice: Subject to any disclaimer, the term of this patent is extended or adjusted under 35 U.S.C. 154(b) by 310 days.

(21) Appl. No.: 12/411,472

(22) Filed: Mar. 26, 2009

(65) Prior Publication Data
US 2009/0247697 A1    Oct. 1, 2009

(30) Foreign Application Priority Data

Mar. 28, 2008  (DE) .......................... 10 2008 016 051

(51) Int. Cl.
| | | |
|---|---|---|
| C07C 265/12 | (2006.01) | |
| C08G 18/00 | (2006.01) | |
| C08G 18/08 | (2006.01) | |
| C08G 18/10 | (2006.01) | |
| C08G 18/28 | (2006.01) | |
| C08G 18/30 | (2006.01) | |
| C08G 18/32 | (2006.01) | |
| C08G 18/70 | (2006.01) | |
| C08G 18/71 | (2006.01) | |
| C08J 3/00 | (2006.01) | |
| C08K 3/20 | (2006.01) | |
| C08L 75/00 | (2006.01) | |

(52) U.S. Cl. ............ 524/589; 524/590; 528/44; 528/59; 528/60; 528/61; 528/65; 528/66; 528/67; 528/68; 528/77; 528/80; 528/81; 528/83; 528/85; 560/359

(58) Field of Classification Search ................. 524/589, 524/590; 528/44, 59, 60, 61, 65, 66, 67, 528/68, 77, 80, 81, 83, 85; 560/359
See application file for complete search history.

(56) References Cited

U.S. PATENT DOCUMENTS

| | | |
|---|---|---|
| 5,426,126 A | 6/1995 | Gebauer et al. |
| 5,817,734 A | 10/1998 | Pantone et al. |
| 6,376,567 B1 | 4/2002 | Werner et al. |
| 2004/0162385 A1 | 8/2004 | Krebs |
| 2004/0259968 A1 | 12/2004 | Krebs |
| 2005/0020706 A1 | 1/2005 | Kollbach et al. |
| 2005/0020797 A1 | 1/2005 | Pirkl et al. |
| 2005/0032973 A1 | 2/2005 | Krebs et al. |

FOREIGN PATENT DOCUMENTS

| | | |
|---|---|---|
| CA | 2154243 A1 | 1/1996 |
| CA | 2640685 A1 | 8/2007 |
| EP | 0550901 A2 | 7/1993 |
| EP | 0693511 A1 | 1/1996 |
| EP | 1506957 A1 | 2/2005 |
| WO | WO-93/09158 A1 | 5/1993 |
| WO | WO-01/40340 A2 | 6/2001 |
| WO | WO-03/006521 A1 | 1/2003 |
| WO | WO-03/033562 A1 | 4/2003 |
| WO | WO-03/051951 A1 | 6/2003 |
| WO | WO-03/055929 A1 | 7/2003 |
| WO | WO-2007/087987 A1 | 8/2007 |

*Primary Examiner* — Patrick Niland
(74) *Attorney, Agent, or Firm* — Connolly Bove Lodge & Hutz LLP

(57) ABSTRACT

Isocyanate mixtures comprising: (a) NCO prepolymers having an NCO content of 1.5 to 18 wt. %; and (b) 1 to 40 wt. % of monomeric 2,2'-diisocyanatodiphenylmethane, based on the isocyanate mixture; wherein the isocyanate mixture has a total NCO content of from 2 to 22 wt. %; polyisocyanate polyaddition products prepared therefrom; and methods of making the same.

18 Claims, No Drawings

2,2'-MDI-BASED ISOCYANATE MIXTURES, POLYISOCYANATE POLYADDITION PRODUCTS PREPARED THEREFROM, PROCESSES FOR MAKING THE SAME AND METHODS FOR THEIR USE

BACKGROUND OF THE INVENTION

The term "MDI" refers to a large number of technically important, but also structurally different, isocyanates. They include both monomers, in which two aromatic structural elements are bonded with one another via a methylene bridge (monomeric MDI), and also higher oligomers, in which more than two aromatic structural elements are bonded with one another in succession via a plurality of methylene bridges (polymeric MDI).

From the user's point of view, it is of great interest to obtain, where possible, the 4,4'- and the 2,4-isomer or mixtures of those two isomers.

The ratio of monomeric to polymeric MDI, and also the proportions of the 4,4'- and 2,4'-isomers in monomeric MDI, can be varied within wide limits by varying the synthesis conditions for the preparation of the precursor.

The separation of the crude MDI obtained in MDI synthesis is for the most part carried out by distillation, wherein there can be separated off, depending on the technical outlay, either almost isomerically pure fractions with contents of 4,4'-MDI, for example, of greater than 97.5 wt. %, or isomeric mixtures with contents of 4,4'- and 2,4'-MDI of in each case about 50 wt. %.

Very recently there has additionally been an increasing need for the 2,4'-isomer. This is due substantially to the different reactivities of the NCO groups in the 2- and 4-positions of 2,4'-MDI (similar to the differences in reactivity of the NCO groups in the 2- and 4-positions of 2,4-toluoylene diisocyanate (TDI)).

These differences in reactivity permit or facilitate the synthesis of low-monomer NCO prepolymers (NCO prepolymers are intermediates which can be isolated during the preparation of finished end polymers—they carry unchanged NCO groups at their chain ends. These are obtained by reacting a polyol with a molar excess of an isocyanate (based on the NCO-reactive or NCO groups) at from room temperature to about 100° C.).

In the case of asymmetric isocyanates (=isocyanates having at least two NCO groups of different reactivities), preferably only one NCO group reacts with the polyol, while the other remains unchanged. The prepolymerization is accordingly considerably simpler to control than is the case with most NCO prepolymers of the prior art, in which there are used isocyanates whose NCO groups do not have different reactivities. In comparison therewith, these also always contain larger amounts of free, monomeric diisocyanate.

The preparation of low-monomer to virtually monomer-free NCO prepolymers is highly desirable in the case of 2,4-TDI because it has a high vapor pressure and polymers containing unreacted 2,4-TDI constitute a high health risk. The NCO prepolymers based on aliphatic diisocyanates, such as, for example, hexamethylene diisocyanate (HDI) or isophorone diisocyanate (IPDI), are to be regarded as even more critical in this respect.

This aspect is also to be taken into consideration in the case of MDI, but it comes to bear to only a reduced extent because of its lower vapor pressure as compared with TDI.

TDI or low-monomer TDI prepolymers are still the current state of the art; the use of pure 2,4'-MDI-containing prepolymers is relatively new on the market.

The preparation of low-monomer NCO prepolymers can be carried out in several ways:

1. By removal of the free monomeric diisocyanate by technically complex thin-layer or short-path evaporation. This possibility can be used regardless of whether diisocyanates having NCO groups of the same or different reactivities are used. Entrainers, for example, can also be used therefor.
2. By the use of diisocyanates having NCO groups of different reactivities or NCO groups of the same reactivity and specially selected stoichiometric ratios, for example molar ratios of NCO to NCO-reactive groups of below 2:1, and/or optionally with special catalysis.
3. Combinations of the two processes, for example in such a manner that the content of free monomeric diisocyanate according to process 2 is first limited to a specific degree and is then minimised further by process 1.

Such combinations can be expedient when the viscosity of the prepolymers is to be minimised. The disadvantage of process 2 is, in principle, that reactions with stoichiometric ratios, in particular below 2:1, lead to increased pre-extension, and there is accordingly an inherent marked increase in the viscosity of the reaction product.

International Pat. Pub. No. WO 01/40340 A2, the entire contents of which are hereby incorporated herein by reference, gives examples of such combinations of process steps, wherein in a first stage the diisocyanate is reacted, using a selectivity-increasing catalyst, to give a NCO prepolymer, which is then freed of excess monomer by thin-layer evaporation.

For particularly critical applications, such as, for example, in the foodstuffs sector, particularly high demands are made of a residual monomer content (key word work hygiene). This is true to a large degree for TDI, but in some cases also for MDI (see above). An indication therefor are numerous publications or patents which are also concerned with low-monomer MDI prepolymers, for example International Pat. Pub. Nos. WO 03/006521, WO 03/033562, WO 03/055929, WO 03/051951, WO 93/09158 and European Pat. Pub. No. EP 0 693 511 A1, the entire contents of each of which are hereby incorporated herein by reference.

For the above-mentioned reasons, the need for the 2,4'-MDI isomer has increased recently, as mentioned. However, owing to the process, this in principle also results in an increased amount of 2,2'-MDI, which has to date been regarded as unusable. For example, it is stated in International Pat. Pub. No. WO 2007/087987, the entire contents of which are hereby incorporated herein by reference: "In the case of monomeric MDI, the 4,4'- and 2,4'-isomers are predominant, owing to the synthesis. The 2,2'-isomer, which is less frequent and is largely of no commercial value, is also formed to a lesser degree".

This is partly because pure 2,2'-MDI is not available industrially and 2,2'-containing formulations often have the disadvantage that this monomer reacts markedly more slowly and therefore less completely. This can lead, for example, to undesirable migration during the bonding of foodstuffs packaging or to the blowing off of foams.

2,2'-MDI, or the formulations containing it, is therefore regarded as waste and must be disposed of in an expensive manner.

Alternative disposal or use of 2,2'-MDI mentioned in the prior art includes the possibility of using 2,2'-MDI for controlling the reaction velocity of isocyanate mixtures containing it. The following possibilities, inter alia, are described in the prior art for controlling the reaction velocity of MDI mixtures:

1. Mixtures with TDI or TDI prepolymers with the associated disadvantage of increased toxicity. Owing to the higher vapor pressure of the TDI monomer, even permitted residual contents of 0.5% lead to disturbing odors and impairments.
2. Extenders in the form of plasticizers, or hydrocarbons in general. There are used, for example, phthalates such as DINP or alternative plasticizers such as 2-cyclohexanedicarboxylic acid diisononyl ester, acetyltributyl citrate or solvents such as ethylene/propylene carbonate, dibasic esters (DBE), solvent naphtha and benzines. Disadvantages here are primarily a reduction in quality and the risk of migration of the non-chemically-bonded additives and the accompanying changes in properties over time.
3. High contents of 2,4-MDI (>85%), see WO 2007/087987 with the accompanying high outlay in terms of isomer separation and the associated cost disadvantages.

BRIEF SUMMARY OF THE INVENTION

The present invention relates, in general, to isocyanate mixtures based on 2,2'-diphenylmethane diisocyanate (2,2'-MDI), to a process for their preparation and to their use in the preparation of polyisocyanate polyaddition products.

Various embodiments of the present invention provide for the use of 2,2'-MDI, which is obtained industrially and which was hitherto not very desirable. The use of 2,2'-MDI in accordance with the present invention is not to be associated with any impairment of the processing conditions or of the (mechanical) properties of the resulting products. Various embodiments of products prepared in accordance with the present invention can constitute an improvement over the prior art.

Various embodiments of the present invention provide an isocyanate mixture having a NCO content of from 2 to 22 wt. %, which is characterized in that it comprises
(a) NCO prepolymers having a NCO content of from 1.5 to 18 wt. % and
(b) monomeric 2,2'-diisocyanatodiphenylmethane (MDI) in an amount of from 1 to 40 wt. %, based on the isocyanate mixture.

The isocyanate mixtures preferably have a NCO content of from 4 to 17 wt. % and the NCO prepolymers preferably have a NCO content of from 2.5 to 15 wt. %. The isocyanate mixture preferably comprises from 2 to 25 wt. %, particularly preferably from 2 to 18 wt. % and most particularly preferably from 3 to 15 wt. %, monomeric 2,2'-MDI.

NCO prepolymers are prepolymers that form in the reaction of organic polyisocyanates with NCO-reactive compounds used in a deficient amount. There are preferably used as the isocyanate 4,4'-diphenylmethane diisocyanate (4,4'-MDI), 2,4'-MDI, 2,2'-MDI, polymeric MDI and mixtures thereof, modified MDI (modification is mostly effected by the incorporation of uretdione, isocyanurate or allophanate groups), toluoylene diisocyanate (TDI), hexamethylene diisocyanate (HDI), isophorone diisocyanate (IPDI), H12-MDI (hydrogenated MDI) and blends of the above-mentioned compounds. There are preferably used as the NCO-reactive compounds polyols (polyether polyols, polyester polyols, polycarbonate polyols, polyalcohols) and polyether polyamines.

For the preparation of the isocyanate prepolymers there can preferably be used compounds having on average at least 1.5, preferably from two to four, hydrogen atoms that are reactive with isocyanate groups, preferably hydroxyl- and/or amine-terminated compounds, such as polyether polyols, polyester polyols, polyalcohols, polyamines or mixtures of these compounds with one another, there preferably being used compounds having a functionality of from 2 to 4, in particular 2, and having a molecular weight of from 200 to 10,000 g/mol, preferably from 500 to 5000 g/mol, particularly preferably from 1000 to 4000 g/mol and most particularly preferably of approximately 2000 g/mol. Particular preference is given to polyether diols having a molecular weight of from 1000 to 4000 g/mol.

The polyols can optionally contain compounds selected from the group consisting of 1,2-ethanediol, 1,2-propanediol, 1,3-propanediol, 1,4-butanediol, glycerol, trimethylolpropane and mixtures thereof.

The isocyanate mixture can additionally contain conventional rheology improvers (for example ethylene carbonate, propylene carbonate, dibasic esters, citric acid esters), stabilisers (for example Broenstedt and Lewis acids, such as, for example, hydrochloric acid, phosphoric acid, benzoyl chloride, organo-mineral acids such as dibutyl phosphate, also adipic acid, malic acid, succinic acid, racemic acid or citric acid), UV stabilisers (for example 2,6-dibutyl-4-methylphenol), catalysts (for example trialkylamines, diazabicyclooctane, tin dioctoate, dibutyltin dilaurate, N-alkylmorpholine, lead, zinc, tin, calcium, magnesium octoate, the corresponding naphthenates and p-nitrophenolate and/or also mercury phenylneodecanoate), hydrolytic stabilisers (for example sterically hindered carbodiimides), emulsifiers, fillers (for example chalk), colourings which can optionally be incorporated into the polyurethane/polyurea that is later to be formed (which colourings accordingly have Zerewitinoff-active hydrogen atoms) and/or colouring pigments.

Further auxiliary substances and additives include emulsifiers, foam stabilisers, cell regulators and fillers. An overview is given in G. Oertel, Polyurethane Handbook, $2^{nd}$ Edition, Carl Hanser Verlag, Munich, 1994, Chap. 3.4.

Additional embodiments of the present invention include processes for the preparation of the isocyanate mixtures according to the invention, which processes are characterized in that
A) an organic polyisocyanate is reacted with a NCO-reactive compound in a deficient amount,
B) there is added to the NCO prepolymer formed under A) a mixture of from 20 to 70 wt. % 2,2'-diisocyanatodiphenylmethane (MDI), from 30 to 80 wt. % 2,4'-diisocyanatodiphenylmethane (MDI) and from 0 to 10 wt. % 4,4'-diisocyanatodiphenylmethane (MDI).

Additional embodiments of the present invention include processes for the preparation of the isocyanate mixture according to the invention, which processes are characterized in that
A) a blend comprising a mixture of from 20 to 70 wt. % 2,2'-MDI, from 30 to 80 wt. % 2,4'-MDI and from 0 to 10 wt. % 4,4'-MDI and optionally further polyisocyanates from the group consisting of 4,4'-diphenylmethane diisocyanate (4,4'-MDI), 2,4'-MDT, 2,2'-MDI, polymeric MDI and mixtures thereof, modified MDI, toluoylene diisocyanate (TDI), hexamethylene diisocyanate (HDI), isophorone diisocyanate (IPDI), H12-MDI (hydrogenated MDI) and blends thereof is reacted with
B) a NCO-reactive component.

Additional embodiments of the present invention include polyisocyanate polyaddition products obtainable from the reaction of
i) isocyanate mixtures according to the invention and
ii) NCO-reactive compounds,
in the presence of
iii) optionally catalysts, iv) optionally fillers, v) optionally auxiliary substances and/or additives.

There are preferably used as the NCO-reactive compounds chain extenders and/or crosslinkers having a molecular weight of from 62 to 600 and a functionality of from 2 to 4, and optionally polyols from the group consisting of polyether polyols, polyester polyols, polyether ester polyols, polycarbonate polyols, polyalcohols, polyamines and polyether polyamines. It is also possible to use as the NCO-reactive compound water/atmospheric moisture on its own or in conjunction with other NCO-reactive compounds.

The invention further provides processes for the preparation of polyisocyanate polyaddition products, wherein an isocyanate mixture according to the invention is reacted with a NCO-reactive compound, optionally in the presence of catalysts, fillers, auxiliary substances and/or additives.

The various process embodiments are preferably carried out in the presence of conventional rheology improvers, stabilisers, UV stabilisers, catalysts, hydrolytic stabilisers, emulsifiers, fillers, optionally incorporable colourings (which accordingly have Zerewitinoff-active hydrogen atoms) and/or colouring pigments. With regard to the representatives of these classes of compound, the same applies as described above in connection with the process for the preparation of the isocyanate mixtures according to the invention.

It is advantageous in the case of the synthesis route via prepolymers as constituents of the isocyanate mixtures according to the invention that some of the heat of reaction already occurs in the synthesis of the prepolymers, and the heat of reaction in the actual polymer synthesis is accordingly lower. This has an advantageous effect on the rate of build-up of the molecular weight and permits longer casting times, that is to say it constitutes an advantage in terms of processing. A disadvantage is the increasing reactivity as the NCO content falls.

It is surprising that, with the targeted use or by the targeted addition of 2,2'-MDI or of mixtures having high contents of 2,2'-MDI, the reaction velocity can be controlled as desired and the above-mentioned disadvantages of the prior art, such as toxicity and limitations in terms of quality, are thereby avoided. It is particularly advantageous that, with long reactivities, advantageous mould-release times can surprisingly be achieved. The improved hydrolytic stability, in particular as compared with TDI prepolymers, was also surprising.

In particular, the isocyanate mixture is easier to process owing to the reduction in the reaction velocity. In addition, reaction with compounds whose reactivity is too high as compared with isocyanate mixtures of the prior art (for example aminic chain extenders and/or crosslinkers, such as, for example, polyamines) is also possible.

The use of the isocyanate mixtures according to the invention has the advantage of longer processing times.

DETAILED DESCRIPTION OF THE INVENTION

As used herein, the singular terms "a" and "the" are synonymous and used interchangeably with "one or more" and "at least one," unless the language and/or context clearly indicates otherwise. Accordingly, for example, reference to "an NCO-reactive compound" herein or in the appended claims can refer to a single NCO-reactive compound or more than one NCO-reactive compound. Additionally, all numerical values, unless otherwise specifically noted, are understood to be modified by the word "about."

The process can be carried out, for example, by reacting the isocyanate mixture in the presence of water, in particular of atmospheric moisture. The "use" of atmospheric moisture corresponds to the use of the isocyanate mixture according to the invention in the form of a 1K system (because, apart from the isocyanate mixture, no further reactants need to be added). The atmospheric moisture reacts sufficiently slowly with the NCO groups to form amine groups, while the hardening is acceptable at the same time. In most cases, such systems are applied in situ.

Alternatively, the process can also be carried out by reacting the isocyanate mixture with at least one polyol component and/or at least one amine component, in particular with a chain extender or crosslinker. This corresponds to reaction in the form of a 2K system. It is also possible to carry out crosslinking with water under pressure, the product so obtained subsequently being used in situ.

Polyurea spray elastomers are also obtainable from the isocyanate mixtures according to the invention.

In general, the component that is reactive towards isocyanates consists of at least 50 wt. %, preferably at least 80 wt. %, of one or more of the described polyether diols. There can be used as amines the compounds described in detail hereinbelow as component bi). The mean functionality of the resulting prepolymer a) is in most cases less than 2.6, preferably less than 2.2. As the main component of the amines b) there is used bi) at least one polyoxyalkyleneamine, preferably a mixture of at least two polyoxyalkyleneamines, so-called polyether amines, that is to say amine-terminated di- or higher-functional polyalkylene oxides, generally polyoxyethylene or polyoxypropylene oxides, having molecular weights of from 200 to 5000 g/mol, in particular from 2000 to 5000 g/mol. It is also possible to use amine-terminated PTHF. The amine groups of the polyether amines are especially primary amine groups. As mentioned, it is also possible to use only one polyether amine. The polyether amines bi) are in particular diamines or triamines. Such compounds are marketed, for example, by Huntsman under the name Jeffamine® or by BASF as polyether amines. Polyamines are mostly prepared by catalytic amination of the corresponding polyalcohols. The polyoxyalkyleneamines bi) are predominantly used to synthesise the soft phase in the polyurea spray elastomers. At least some of the amines bi) used can be replaced by polyetherols. As already mentioned, amine components that contain both polyether amines and polyetherols are referred to as hybrid or mixed polyurea-polyurethane systems. The proportion of amine—as compared with hydroxyl-terminated polyether in the amine component in this invention is preferably more than 50 wt. %, particularly preferably it consists substantially of amine-terminated polyethers. Component b) can further contain as chain extenders bii) low molecular weight, generally aromatic and diaminic amines other than bi). These compounds mostly have a molecular weight in the range from 150 to 500 g/mol, The amine groups of the chain extenders bii) can be primary or secondary. The chain extender mostly used in polyurea spray elastomers is diethylenetoluenediamine (DETDA). As the component that is less reactive as compared with aliphatic amines, DETDA determines the curing behaviour of the system. Accordingly, the gel time can be controlled by alternative chain extenders having reduced reactivity towards isocyanates. In order to obtain light-stable polyurea spray elastomers, it is also possible to use aliphatic chain extenders. It is additionally possible to use the alternative aminic chain extenders already mentioned, such as 4,4'-methylenebis-(2,6-diethyl)-aniline (MDEA), 4,4'-methylenebis-(2,6-diisopropyl)-aniline (MDIPA), 4,4'-methylenebis-(3-chloro-2,6-diethyl)-aniline (MCDEA), dimethyl-thiotoluenediamine (DMTDA, Ethacure® 300) or reaction-retarding chain extenders having secondary amine functions, such as N,N'-di(sec-butyl)-amino-biphenylmethane (DB- MDA, Unilink® 4200) or N,N'-di-sec-butyl-p-phenylenediamine (Unilink® 4100). Further formulation constituents, which are not absolutely necessary, are, for example diluents, mostly reactive diluents, which, when used, are generally added to the isocyanate component. Examples of reactive diluents of the isocyanate component are alkylene carbonates. However, the addition of reactive diluents can lead to an impairment of the mechanical properties and ageing resistance of the polyurea spray elastomer. The addition of additives to the amine component is limited by a processable viscosity. Such additives are pigments, adhesion promoters, UV stabilisers, antioxidants or other fillers. Component b) can further contain in particular abrasion improvers. There are used as abrasion improvers preferably silicone-modified alcohols, in particular glycols. The system is generally applied by spraying, wherein the components are mixed under high pressure and at elevated temperature in the mixing head of the spray gun before they are discharged therefrom, and are thus made to react. The volumetric ratio in which the polyisocyanate and the amine component are sprayed is preferably 1:1 but can also be from 30:70 to 70:30 vol %, but preferably up to 1.1:1. The sprayed surface can be pretreated with a primer, in particular if it is wet, in order to improve adhesion. The adhesion improver can also be added to the B-component or preferably to the R-component, likewise in particular for adhesion to a wet substrate. Examples of primers are siloxanes and functionalised siloxanes. Particular mention may be made of epoxy-amino-or vinyl-alkoxy-silanes. Further examples of commercially available primers are titanates, such as neopentyl(diallyl)oxytri(m-amino)phenyl titanate, or zirconates, such as neopentyl(diallyl)oxytri(methylenediamino)ethyl zirconate. Further possible primers are 1K or 2K polyurethane systems (1-component or 2-component systems, see hereinbelow), polyvinylamines, polyacrylates or epoxy resins. Before application, the primers can be dispersed, emulsified or dissolved in water or other solvents. The ratio of isocyanate groups to groups that are reactive towards isocyanate groups, in particular, as stated, amine groups, in the preparation of the polyurea spray elastomers is in most cases from 0.90 to 1.20, in particular from 1.05 to 1.15. It has been found that, by increasing the 2,2'-MDI content in the isocyanate prepolymer used, the reduced reactivity of a given polyurea formulation manifests itself in an increase in the gel time by several seconds.

Typical fields of application of polyurea spray elastomers are coatings, in particular for repairing concrete and protecting against water (coverings for roofs and car park decks, bridge and tunnel repairs), so-called "secondary containment" (coatings for receivers of tanks for chemicals, waste water or oil, or loading areas for hazardous goods), corrosion protection (loading areas of freight ships, lorries, pick-ups and railway wagons) or so-called "primary containment" (sewer manholes, clarification plants). Polyurea spray elastomers are reaction products of an at least difunctional isocyanate with an at least difunctional primary or secondary amine. As amines there are conventionally used high molecular weight polyether amines and low molecular weight aminic chain extenders. The amine component, which is frequently referred to in the art as the R component, is conventionally a mixture of primary aliphatic polyether amines and generally aromatic aminic chain extenders. The principal constituent of the amine component of a polyurea formulation is a mixture of polyether amines, that is to say of amine-terminated di- or higher-functional polyethylene or polypropylene oxides having molecular weights from 200 to 5000 g/mol. The aliphatic amines react more quickly than the aromatic components of the chain extenders and serve predominantly to synthesise the soft phase of the polyurea spray elastomers. The chain extender conventionally used in the polyurea formulation is diethylenetoluenediamine (DETDA). As the component that is less reactive compared with aliphatic amines, DETDA determines the curing behaviour of the system. In order to synthesise light-stable polyureas, aliphatic chain extenders are also used. The mostly aromatic chain extenders are incorporated predominantly into the hard phase of the polyurea spray elastomers. As mentioned, polyurea spray elastomers are mostly used as coatings. To that end, their liquid starting components, conventionally referred to as a system or formulation, are mixed under high pressure and sprayed onto the surface to be coated, where they cure. The reaction time is conventionally only a few seconds. In order to achieve optimal processing and product properties, it is desirable to keep the viscosity of the liquid starting components as low as possible or to make the viscosities of the isocyanate component and the amine component largely equal. Only thus is it possible to ensure adequate miscibility of the extremely reactive components. Mixing errors result in a reduced surface quality. Low-viscosity systems are more readily processable, that is to say they can be processed at lower pressures and temperatures. Furthermore, the reaction should not proceed too quickly in order to ensure optimum distribution of the reactive starting components before they cure completely on the surface to be coated.

For the preparation of cast elastomers, the isocyanate mixtures according to the invention are reacted with chain extenders.

In a particularly preferred embodiment of the preparation of PUR cast elastomers by the process according to the invention, the isocyanate mixtures are first degassed at room temperature or at elevated temperature by application of a reduced pressure and then mixed—mostly at elevated temperature—with a chain extender. In the process, the isocyanate mixture is preferably heated to a temperature of from 40° C. to 110° C. and degassed in vacuo, with stirring. The chain extender and/or crosslinker is then added, this optionally being heated to temperatures of typically at least 5° C. above its melting point. The reaction mixture is poured out in the open and/or introduced into open or closed moulds.

Preferred chain extenders are aromatic aminic chain extenders such as, for example, diethyltoluenediamine (DETDA), 3,3'-dichloro-4,4'-diamino-diphenylmethane (MBOCA), 3,5-diamino-4-chloro-isobutyl benzoate, 4-methyl-2,6-bis(methylthio)-1,3-diaminobenzene (Ethacure 300), trimethylene glycol di-p-aminobenzoate (Polarcure 740M) and 4,4'-diamino-2,2'-dichloro-5,5'-diethyldiphenylmethane (MCDEA). MBOCA and 3,5-diamino-4-chloroisobutyl benzoate are particularly preferred. Aliphatic aminic chain extenders can likewise be used or used concomitantly. The use of amines is possible because the isocyanate mixtures according to the invention have markedly lower reactivity as compared with known prepolymers. This permits reaction also with highly reactive amines. This is not possible with the known prepolymers or isocyanate mixtures based on MDI, which are therefore normally reacted with diols, such as diethylene glycol or 1,4-butanediol.

In the preparation of polyisocyanate polyaddition products there can be used as NCO-reactive compounds preferably polyols having OH numbers in a range from 10 to 400, preferably from 27 to 150, particularly preferably from 27 to 120 mg KOH/g and a mean functionality of from 1.8 to 2.4. There can be used as polyols polyether, polyester, polycarbonate and polyether ester polyols.

Polyether polyols are prepared from a starter molecule and epoxides, preferably ethylene and/or propylene oxide, either by means of alkaline catalysis or by means of double-metal-cyanide catalysis or optionally, in the case of a stepwise reaction, by means of alkaline catalysis and double-metal-cyanide catalysis, and have terminal hydroxyl groups. There come into consideration as starters the compounds known to the person skilled in the art having hydroxyl and/or amino groups, as well as water. The functionality of the starters is at least 2 and not more than 4. Of course, mixtures of a plurality of starters can also be used. Mixtures of a plurality of polyether polyols can also be used as polyether polyols.

Polyester polyols are prepared in a manner known per se by polycondensation from aliphatic and/or aromatic polycarboxylic acids having from 4 to 16 carbon atoms, optionally from their anhydrides and optionally from their low molecular weight esters, including cyclic esters, there being used as reaction component predominantly low molecular weight polyols having from 2 to 12 carbon atoms. The functionality of the chain-extension components for polyester polyols is preferably 2, but it can also be greater than 2 in an individual case, components having functionalities greater than 2 being used only in small amounts, so that the calculated number-average functionality of the polyester polyols is in the range from 2 to 2.5, preferably from 2 to 2.1. Alternatively, polyester polyols can also be prepared by ring-opening polymerisation as, for example, in the case of $\epsilon$-caprolactone.

Polyether ester polyols are prepared by the concomitant use of polyether polyols in the polyester polyol synthesis.

Polycarbonate polyols are obtained according to the prior art by means of polycondensation from carbonic acid derivatives, for example dimethyl or diphenyl carbonate or phosgene, and polyols.

The preparation of the polyisocyanate polyaddition products can also be carried out in the presence of further inorganic and/or organic fillers and/or auxiliary substances, in particular pigments, rubber granules, recycled granules, fibres, quartz stones, wood fibres and/or sand.

The polyisocyanate polyaddition products according to the invention are used as a coating, binder, floor covering, adhesion promoter, adhesive, filling compound, wall covering.

The polyisocyanate polyaddition products according to the invention are used in the production of rolls, wheels, rollers, resins, mouldings, sieves, scrapers and bumpers.

The polyisocyanate polyaddition products according to the invention are used in the automotive industry, in the recreational sector, in the sports sector, in machine and plant construction, in the electrical and electronics industry, in railway construction and in mining.

A particularly valuable use of the isocyanate mixtures according to the invention is the preparation of 1K and 2K coating compositions. The isocyanate mixtures are thereby mixed in amounts of from 6 to 25% with rubber granules, such as, for example, SBR, EPDM, recycled granules of grain size 0.5 to 50 mm and/or fibres having a length of from 0.1 to 50 mm and/or mineral additives of grain size 1 to 20 mm and processed to give a resilient layer for sports floors. It is also possible for the isocyanate mixture to be mixed in amounts of from 10 to 25% with rubber granules, such as, for example, SBR, EPDM, recycled granules of grain size 0.5 to 50 mm and/or fibres, as well as mixtures of the above-mentioned components, and processed to give sports areas, recreation areas and children's play areas. Blending in amounts of from 11 to 15% with quartz sand as well as with decorative quartz stones and processing to give skate parks or (foot)paths is also conventional. An isocyanate mixture can be mixed in amounts of from 10 to 40% with wood fibre materials and processed to give paths for nature parks. When mixed in amounts of from 8 to 20% with rubber granules, it can be used to produce so-called cylinders from which rubber mats for sport, recreation, children's play areas and insulating mats can be produced. From 15 to 25% of isocyanate mixture in a blend with rubber granules can be used to produce decorative sheets for the garden and recreation sector. The isocyanate mixture can also be used in a 2K system in the above-mentioned fields, the isocyanate mixture in amounts of from 25 to 50% functioning as curing agent, It is also possible for the isocyanate mixture to be used in amounts of from 7 to 18% with rubber granules in so-called 1K and 2K envelope coatings. The resulting coated rubber granules are preferably used as an infill material in artificial lawns.

The isocyanate mixtures according to the invention can also be used as 1K and 2K adhesives for the adhesive bonding of artificial lawns, textile and wooden floors, insulating mats, rubber mats and decorative sheets. It is also possible to use 1K and 2K spray coatings based on the isocyanate mixtures on resilient substrates (for example rubber granule mats) or rigid substrates (e.g. asphalt or concrete), which optionally contain from 5 to 80% structural fillers (such as SBR, EPDM, TPE-S granules or PU chips). 1K and 2K adhesion promoters or primers based on the isocyanate mixtures can likewise be used on substrates such as, for example, asphalt, cement-bonded substrates, wood or wood strip, of sports, recreational or children's play flooring. A further possible use is in a 2K system as a flow coating on resilient or rigid substrates, wherein the application can be carried out in one or more layers and optionally with infill granules (in particular EPDM granules of grain size 0.5 to 5 mm). The mixtures according to the invention can also be used as 2K filler compounds for closing the pores of substrates.

The 1K systems according to the invention are moisture-curing systems, The curing process can be carried out in situ without the addition of water (curing takes place by means of atmospheric moisture) or in an industrial manufacturing process with the targeted addition of water and optionally under pressure.

The invention will now be described in further detail with reference to the following non-limiting examples.

EXAMPLES

Hereinbelow, all percentages are wt. % unless indicated otherwise.

Preparation of the Isocyanate Mixtures:

An isocyanate mixture was placed in a reaction vessel and heated to 40 to 60° C., with stirring. Polyol compounds were added, with stirring, and stirring was continued until the theoretical NCO content to be expected according to the chosen stoichiometry had approximately been reached. The catalyst was then optionally added. After the optional addition of acid as stabilizer, the reaction mixture was cooled.

Table 1 below shows the isocyanate mixtures of Examples 1 to 5 prepared according to these instructions, and also some properties of the 1K polyurethanes cured by means of atmospheric moisture.

TABLE 1

|  | Example 1 | Example 2 | Example 3 | Example 4 (comparison) | Example 5 (comparison) |
|---|---|---|---|---|---|
| 4,4'-MDI | 18.50% | 17.63% | 19.40% | 17.5% | 26.9% |
| 2,4'-MDI | 17.90% | 16.77% | 15.90% | 7.5% | 11.5% |
| 2,2'-MDI | 5.20% | 4.80% | 3.97% | | |
| Polymeric MDI | | | | | 4.0 |
| TDI (80/20) | | | | 9.8 | |
| Arco PPG 2000, polypropylene glycol having a mean MW of 2000 and a functionality of 2 | 58.40% | 55.40% | 55.34% | 65.175 | 57.595 |
| 2,2-Dimorpholine diethyl ether (amine catalyst) | | | | 0.02 | |
| Benzoyl chloride, as stabiliser | | | | 0.005 | 0.005 |
| Jeffsol PC, propylene carbonate | | 5.4% | 5.4% | | |
| NCO content [wt. %] | 10.63 | 10.27 | 10.3 | 10.3 | 10.3 |
| Viscosity at 21° C. [mPas] | 4392 | 2380 | 2450 | 2899 | 5428 |
| Curing time (21° C., 46% rel. humidity, 0.6 mm layer thickness) | 16 h 30 min. (dry to touch) | 16 h (dry to touch) | 15 h 30 min. (dry to touch) | 24 h (dry to touch) | 12 h (dry to touch) |
| Beginning of reaction with atmospheric humidity | 9 h 30 min. | 9 h | 8 h 40 min. | 9 h | 6.5 h |
| Hydrolytic stability (80° C.) | very good | very good | very good | very poor | very good |
| Tensile strength [MPa] (according to DIN 53504) | 20.35 | 21.64 | 24.01 | 10.36 | 17.33 |
| Ultimate elongation [%] (according to DIN 53504) | 522 | 549 | 435 | 477 | 365 |

In comparison with Example 5, Examples 1 to 3 according to the invention are distinguished by the fact that the reaction starts considerably later (about 40% improvement). It is particularly advantageous that curing is increased by only about 30% and is accordingly still within a technically expedient range. In Example 4, although the late starting reaction is comparable with that in Examples 1 to 3, the shorter curing time is advantageous. A further important advantage of Examples 1 to 3, in addition to the fact that they are TDI-free, is their markedly improved hydrolytic stability and their higher tensile strength, while the elongation is higher at the same time.

Preparation of the NCO Prepolymers:

Preparation of NCO Prepolymer A:

18.89 parts by weight of 2,4'-MDI were placed in a vessel at 50° C. 81.11 parts by weight of a polyester (prepared from adipic acid and ethylene glycol; OH number 56), preheated to 50° C., were than added, with stirring, After a reaction time of 7 hours at 80° C., the reaction was complete. A product having the following data was obtained:

| NCO content: | 2.98 wt. % |
|---|---|
| Viscosity (70° C.): | 4800 mPas |

Preparation of NCO Prepolymer B:

26.67 parts by weight of 2,4'-MDI were placed in a vessel at 50° C. 73.33 parts by weight of a polyether (Terathane® 1000 from INVISTA; OH number 112), preheated to 50° C., were then added. After a reaction time of 2 hours at 80° C., the reaction was complete. A product having the following data was obtained:

| NCO content: | 2.75 wt. % |
|---|---|
| Viscosity (70° C.): | 5400 mPas |

Isocyanate C:

Isocyanate mixture consisting of 36.9% 2,2'-MDI, 59.2% 2,4'-MDI and 3.9% 4,4'-MDI Preparation of the Isocyanate Mixtures:

The above-mentioned NCO prepolymers were mixed with isocyanate C in the amounts according to Table 2 and stirred for one hour at 80° C. for the purpose of homogenization. Mixtures having the data indicated in Table 2 were obtained.

TABLE 2

| Mixture | Isocyanate C [wt. %] | NCO prepolymer A [wt. %] | NCO prepolymer B [wt. %] | NCO content of the mixture [wt. %] | Viscosity of the mixture mPas (70° C.) |
|---|---|---|---|---|---|
| M1 | 3.63 | 96.37 | | 3.94 | 4700 |
| M2 | 10.21 | 89.79 | | 5.97 | 3150 |
| M3 | 3.63 | | 96.37 | 3.82 | 5500 |
| M4 | 10.20 | | 89.80 | 5.85 | 3800 |
| M5 | 16.76 | | 83.24 | 7.85 | 2700 |

The properties of the cast elastomers prepared from mixtures M1 to M5 and M6 and M7 with Baytec® XL 1604 (from Bayer MaterialScience AG; 3,5-diamino-4-chloroisobutyl benzoate) are indicated in Table 3.

Preparation of the Cast Elastomers:

100 parts by weight of the isocyanate mixture were degassed in vacuo at 90° C., with slow stirring, until free of bubbles. The whole was then mixed with Baytec® XL 1604, which had been preheated to 100° C. The homogeneous melt was poured into moulds preheated to 110° C. and was maintained at 110° C. for 24 hours. The mechanical properties of the cast elastomers were then measured.

M6 is a NCO prepolymer based on 2,4'-MDI and Terathane® 1000 from INVISTA (OH number: 112). This prepolymer is obtainable from Bayer MaterialScience AG under the name Desmodur® VP.PU ME 40TF04 (NCO content: 3.93%).

M7 is a NCO prepolymer based on 2,4'-MDI and a polyadipate (prepared from adipic acid and ethylene glycol; OH number 56). This prepolymer is obtainable from Bayer MaterialScience AG under the name Desmodur® VP.PU MS 40TF01 (NCO content: 3.95%).

A comparison of the elastomers of Examples 8 and 11 (same NCO content of the isocyanate component; same soft segment (polyol)) shows that the elastomer according to the invention of Example 8 has a longer casting time and, in particular, a markedly better permanent set, better resilience, lower abrasion and better stress at break. The mechanical properties of the elastomer according to the invention are therefore clearly better.

A comparison of the elastomers of Example 6 and Comparison Example 12 (same NCO content of the isocyanate component; same soft segment (polyol)) shows that the elastomer according to the invention of Example 6 has a markedly longer casting time, a better permanent set, lower abrasion and better stress at break, so that the elastomer of Example 6 is clearly superior to the elastomer of Comparison Example 12 in terms of its mechanical properties.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

TABLE 3

Preparation of cast elastomers

| Example | | 6 | 7 | 8 | 9 | 10 | 11 (comp.) | 12 (comp.) |
|---|---|---|---|---|---|---|---|---|
| Isocyanate mixture | | M1 | M2 | M3 | M4 | M5 | M6 | M7 |
| Amount of | [parts by wt.] | 100 | 100 | 100 | 100 | 100 | 100 | 100 |
| Amount of Baytec ® XL1604 | [parts by wt.] | 10.6 | 16 | 10.3 | 15.8 | 21.2 | 10 | 10 |
| Casting time | [sec.] | 330 | 135 | 495 | 240 | 115 | 480 | 210 |
| Mechanical properties | | | | | | | | |
| Shore A (DIN 53505) | | 92 | 98 | 89 | 97 | 99 | 91 | 92 |
| Shore D (DIN 53505) | | 34 | 47 | 33 | 45 | 56 | 34 | 35 |
| Stress (100%) (DIN 53504) | [MPa] | 7 | 9 | 7 | 10 | 13 | 8 | 7 |
| Stress (300%) (DIN 53504) | [MPa] | 13 | 17 | 13 | 20 | 28 | 11 | 12 |
| Stress at break (DIN 53504) | [MPa] | 57 | 53 | 47 | 53 | 49 | 29 | 45 |
| Ultimate elongation (DIN 53504) | [%] | 700 | 650 | 550 | 480 | 420 | 600 | 680 |
| Graves (DIN 53515) | [kN/m] | 79 | 100 | 42 | 66 | 91 | 60 | 79 |
| Rebound resilience (DIN 53512) | [%] | 41 | 43 | 50 | 47 | 50 | 52 | 43 |
| Abrasion (DIN 53516) | [mm$^3$] | 38 | 49 | 25 | 25 | 40 | 46 | 70 |
| Permanent set, 22° C. (DIN 53517) | [%] | 18 | 28 | 16 | 25 | 36 | 26 | 22 |
| Permanent set, 70° C. (DIN 53517) | [%] | 35 | 52 | 32 | 47 | 66 | 44 | 44 |

What is claimed is:

1. A process for preparing a polyisocyanate polyaddition product, the process comprising: reacting an organic polyisocyanate with a deficient amount of an NCO-reactive compound to form an NCO prepolymer; adding a mixture of 20 to 70 wt. % of 2,2'-diisocyanatodiphenylmethane, 30 to 80 wt. % of 2,4'-diiso-cyanatodiphenylmethane and 0 to 10 wt. % 4,4'-diisocyanatodiphenylmethane to the NCO prepolymer to form an isocyanate mixture; and reacting the isocyanate mixture and an NCO-reactive compound.

2. The process according to claim 1, wherein the isocyanate mixture and the NCO-reactive compound are reacted in the presence of one or more additional compounds selected from the group consisting of catalysts, fillers, additives, and combinations thereof.

3. The process according to claim 1, wherein the NCO-reactive compound comprises one or more compounds selected from the group consisting of chain extenders, crosslinking agents, and mixtures thereof, having a molecular weight of 62 to 600 and a functionality of 2 to 3.

4. The process according to claim 1, wherein the NCO-reactive compound comprises one or more polyols selected from the group consisting of polyether polyols, polyester polyols, polycarbonate polyols, polyether polyamines and mixtures thereof.

5. The process for preparing a polyisocyanate polyaddition product according to claim 1 further comprising reacting the isocyanate mixture and atmospheric moisture.

6. A process comprising: reacting an organic polyisocyanate with a deficient amount of an NCO-reactive compound to form an NCO prepolymer; and adding a mixture of 20 to 70 wt. % of 2,2'-diisocyanatodiphenylmethane, 30 to 80 wt. % of 2,4'-diiso-cyanatodiphenylmethane and 0 to 10 wt. % 4,4'-diisocyanatodiphenylmethane to the NCO prepolymer to form an isocyanate mixture.

7. A process comprising: providing an initial mixture of 20 to 70 wt. % of 2,2'-diisocyanatodiphenylmethane, 30 to 80 wt. % of 2,4'-diiso-cyanatodiphenylmethane and 0 to 10 wt. % 4,4'-diisocyanatodiphenylmethane, and optionally a further polyisocyanate; and reacting the initial mixture with an a NCO-reactive component to form an isocyanate mixture.

8. The process according to claim 6, wherein the initial mixture comprises a further polyisocyanate selected from the group consisting of 4,4'-diphenylmethane diisocyanate (4,4'-MDI), 2,4'-MDI, 2,2'-MDI, polymeric MDI and mixtures thereof, modified MDI, toluylene diisocyanate (TDI), hexamethylene diisocyanate (HDI), isophorone diisocyanate (IPDI), H12-MDI (hydrogenated MDI), and combinations thereof.

9. A polyisocyanate product prepared by the process according to claim 1.

10. A polyisocyanate product prepared by the process according to claim 2.

11. A polyisocyanate product prepared by the process according to claim 3.

12. A polyisocyanate product prepared by the process according to claim 4.

13. A polyisocyanate product prepared by the process according to claim 5.

14. The process according to claim 7, further comprising reacting the isocyanate mixture and an NCO-reactive compound.

15. The process according to claim 7, wherein the isocyanate mixture and the NCO-reactive compound are reacted in the presence of one or more additional compounds selected from the group consisting of catalysts, fillers, additives, and combinations thereof.

16. The process according to claim 7, wherein the NCO-reactive compound comprises one or more compounds selected from the group consisting of chain extenders, crosslinking agents, and mixtures thereof, having a molecular weight of 62 to 600 and a functionality of 2 to 3.

17. The process according to claim 7, wherein the NCO-reactive compound comprises one or more polyols selected from the group consisting of polyether polyols, polyester polyols, polycarbonate polyols, polyether polyamines and mixtures thereof.

18. The process according to claim 7, further comprising reacting the isocyanate mixture and atmospheric moisture.

* * * * *